United States Patent Office 3,577,439
Patented May 4, 1971

3,577,439
3-(1,8-DIMETHOXY-4-METHYL-2-NAPHTHYL)-4,6-DIALKOXY-5-SUBSTITUTED PHTHALIDES
Jerry Robert Daniel McCormick, Spring Valley, and Nancy Hazlett Arnold, Pearl River, N.Y., assignors to American Cyanamid Company, Stamford, Conn.
No Drawing. Filed Aug. 19, 1969, Ser. No. 851,463
Int. Cl. C07d 5/38
U.S. Cl. 260—343.3                 10 Claims

ABSTRACT OF THE DISCLOSURE

This disclosure describes 3-(1,8-dimethoxy-4-methyl-2-naphthyl-4,6-dialkoxy-5-substituted phthalides useful as intermediates for the preparation of 6-methyl-1,3,10,11,12-pentahydroxynaphthacene-2-carboxamide.

BRIEF SUMMARY OF THE INVENTION

This invention relates to new organic compounds and more particularly, is concerned with novel 3-(1,8-dimethoxy - 4 - methyl - 2 - naphthyl)-4,6-dialkoxy-5-substituted phthalides which may be represented by the following general formula:

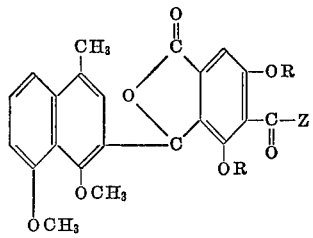

wherein R is lower alkyl and Z is lower alkoxy, hydroxy, chloro, bromo or amino. Suitable lower alkyl and lower alkoxy groups contemplated by the present invention are those having up to four carbon atoms such as, for example, methyl, ethyl, isopropyl, sec-butyl, methoxy, ethoxy, n-propoxy, isobutoxy, etc. Typical compounds of the present invention represented by the above general formula are, for example, 3-(1,8-dimethoxy-4-methyl-2-naphthyl)-4,6-dimethoxy-5-carbethoxyphthalide,
3-(1,8-dimethoxy-4-methyl-2-naphthyl)-4,6-diethoxy-5-carbomethoxyphthalide,
3-(1,8-dimethoxy-4-methyl-2-naphthyl)-4,6-diethoxy-5-bromocarbonylphthalide,
3-(1,8-dimethoxy-4-methyl-2-naphthyl)-4,6-diethoxy-5-carboxamidophthalide,
3-(1,8-dimethoxy-4-methyl-2-naphthyl)-4,6-di-n-propoxy-5-carbo-n-butoxyphthalide,
3-(1,8-dimethoxy-4-methyl-2-naphthyl)-4,6-di-n-propoxy-5-carboxyphthalide,
3-(1,8-dimethoxy-4-methyl-2-naphthyl)-4,6-diisopropoxy-5-carbethoxyphthalide,
3-(1,8-dimethoxy-4-methyl-2-naphthyl)-4,6-diisopropoxy-5-carboxamidophthalide,
3-(1,8-dimethoxy-4-methyl-2-naphthyl)-4,6-diisobutoxy-5-carbo-n-propoxyphthalide,
3-(1,8-dimethoxy-4-methyl-2-naphthyl)-4,6-diisobutoxy-5-carboxyphthalide,
3-(1,8-dimethoxy-4-methyl-2-naphthyl)-4,6-di-n-butoxy-5-chlorocarbonylphthalide,
3-(1,8-dimethoxy-4-methyl-2-naphthyl)-4,6-di-n-butoxy-5-carboxamidophthalide, and the like.

DETAILED DESCRIPTION OF THE INVENTION

The novel compounds of the present invention are generally obtainable as white crystalline materials having characteristic melting points and absorption spectra and appreciable solubility in organic solvents such as dimethylformamide, ethanol and chloroform. However, they are generally insoluble in water and petroleum ether.

The novel 3-(1,8-dimethoxy-4-methyl-2-naphthyl)-4,6-dialkoxy-5-substituted phthalides of the present invention may be readily prepared from the corresponding dialkyl 2-formyl-3,5-dialkoxyterephthalates as illustrated in the following reaction scheme:

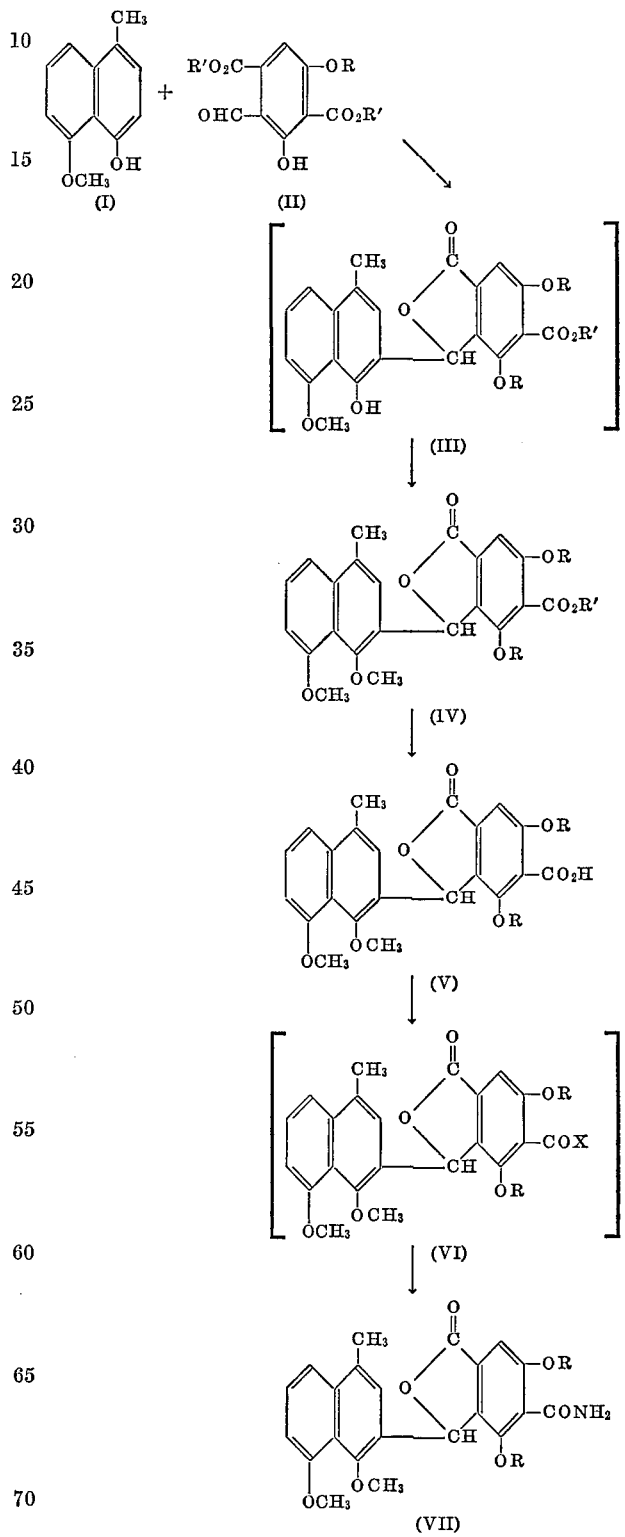

wherein R and R' are each lower alkyl groups having from 1 to 4 carbon atoms and X is chloro or bromo. In accordance with the above reaction scheme, condensation of a dialkyl 2-formyl-3,5-dialkoxyterephthalate (II) with the naphthol derivative (I) is carried out under the general conditions of the Friedel-Crafts reaction employing, for example, boric anhydride, sulfuric acid, anhydrous aluminum chloride or anhydrous ferric chloride as catalyst. The condensation may be carried out in a high boiling inert solvent, or in a melt such as boric anhydride or the eutectic of sodium chloride and aluminum chloride at temperatures in excess of 100° C. Preferably, the condensation is carried out in an acetic acid-10% $H_2SO_4$ mixture whereby the hydroxyphthalide ester (III) is obtained in excellent yield. The hydroxyphthalide esters (III) have the usual tendency of naphthols to undergo spontaneous degeneration to intensely colored amorphous mixtures and hence they are not isolated as such but are immediately methylated to yield the dimethoxyphthalide esters (IV) by means of dimethyl sulfate. Hydrolysis of the phthalide esters (IV) to the corresponding phthalide acids (V) is readily accomplished in dilute methanolic sodium hydroxide at 50–75° C. for about 2–4 hours. Conversion of the phthalide acids (V) to the corresponding phthalide acid halides (VI) is achieved by means of oxalyl chloride or oxalyl bromide in chloroform at the reflux temperature for a period of time of 1–3 hours. Ammonolysis of the phthalide acid halides (VI) (not isolated) with ammonia in diethyl ether at 0–10° C. for a few hours yields the phthalide amides (VII).

The intermediate dialkyl 2-formyl-3,5-dialkoxyterephthalates may be readily prepared by the alkylation of the corresponding dialkyl 2-formyl-3,5-dihydroxyterephthalates using a dialkyl sulfate such as diethyl sulfate, diisopropyl sulfate, di(n-butyl) sulfate, etc. This alkylation is carried out in a suitable solvent such as toluene and in the presence of a stoichiometric excess of a base (such as potassium carbonate) at the reflux temperature for a period of time of 3–5 hours. The dialkyl 2-formyl-3,5-dihydroxyterephthalates may be readily prepared by a modified Gatterman formylation of the corresponding dialkyl 2,6-dihydroxyterephthalates. This formylation is carried out in diethyl ether as solvent, under anhydrous conditions, and in the presence of hydrogen cyanide, hydrogen chloride and aluminum chloride at the reflux temperature for a period of time of 2–4 hours.

The novel compounds of the present invention are useful as intermediates in the synthesis of 6-methyl-1,3,10,11,12-pentahydroxynaphthacene-2-carboxamide as illustrated in the following reaction scheme:

Oxidation of the phthalide amides (VII) to the corresponding naphthoylterephthalamic acids (VIII) is accomplished by means of autoxidation with oxygen in the presence of tetramethylurea and potassium tertiary butoxide in refluxing tertiary butyl alcohol as solvent for 3–5 hours. Cyclization of the naphthoylterephthalamic acids (VIII), with simultaneous dealkylation of the four ether groups, is carried out under the general conditions of the Friedel-Crafts reaction employing, for example, boric anhydride, sulfuric acid, anhydrous aluminum chloride or anhydrous ferric chloride as catalyst. The cyclization may be carried out in a high boiling inert solvent, or in a melt such as boric anhydride or the eutectic of sodium chloride and aluminum chloride at temperatures in excess of 100° C. Preferably, the cyclization is carried out by fusion with $NaCl \cdot AlCl_3$ at 200° C. whereby the 6-methyl-1,3,10,11-tetrahydroxynaphthacene - 2 - carboxamide-5,12-quinone (IX) is obtained. Reduction of the naphthacene-5,12-quinone (IX) to the 5-deoxygenated derivative (X) may be readily accomplished by any of several well-known procedures described in the chemical literature for the reduction of 1-hydroxyanthraquinones to the corresponding 9-anthrones. For example, this reduction may be accomplished with boiling hydriodic acid, with tin and hydrochloric acid, or by catalytic hydrogenation with a nickel or noble metal catalyst. Preferably, the reduction is carried out in refluxing HI-phenol whereby the 6-methyl-1,3,10,11,12 - pentahydroxynaphthacene - 2-carboxamide (X) is obtained in good yield. The 6-methyl-1,3,10,11,12-pentahydroxynaphthacene-2-carboxamide (X) may be readily transformed to physiologically active antibiotics of the tetracycline series as is set forth in greater detail in U.S. Pat. No. 3,226,305 to McCormick et al.

The invention will be more particularly illustrated by means of the following specific examples.

EXAMPLE 1

Preparation of 2-formyl-3,5-dihydroxyterephthalic acid, dimethyl ester

A 500 ml. round-bottom flask is set up in the hood with a reflux condenser, magnetic stirrer and an ice bath. A $CaCl_2$ drying tube is attached to the top of the condenser. In order, 5 g. (0.022 mole) of 2,6-dihydroxyterephthalic acid, dimethyl ester [Monatshefte 50, 219 (1928)], 45 ml. of diethyl ether, a cold solution of 23.8 g. (0.179 mole) of $AlCl_3$ in 90 ml. of diethyl ether, and 7.14 ml. (0.185 mole) of cold liquid HCN are added to the flask. The ice bath is removed and the reaction mixture is refluxed for about an hour. Then, 14.3 g. (0.392 mole) of anhydrous HCl is dissolved in 85 ml. of cold diethyl ether and is added slowly (15 minutes) to the reaction mixture through the condenser, and refluxing is continued for 3 more hours. After cooling in an ice bath, the reaction is quenched by the careful addition of 360 ml. of 1 I HCl. The solution is then heated on the steam bath in the hood until the ether and excess HCN have evaporated and the temperature reaches 70°–75° C. After cooling again, the product is extracted with 800 ml. of diethyl ether. The ether extract is washed with 80 ml. of water and then extracted 3 times with 150 ml. of 5% $NaHCO_3$ solution. The $NaHCO_3$ extract is acidified with 25 ml. of concentrated HCl. The tan crystalline product is removed by filtration, washed 0.1 N HCl, and dried. Yield is about 3 g. (50–55%) with melting point about 120° C. Recrystallization from hot methanol provides product with melting point at 126°–127° C.

EXAMPLE 2

Preparation of 2-formyl-3,5-dihydroxyterephthalic acid, diethyl ester

By replacing the 2,6-dihydroxyterephthalic acid, dimethyl esther employed in Example 1 with an equimolar quantity of 2,6-dihdroxyterephthalic acid, diethyl ester and following substantially the same procedure described in

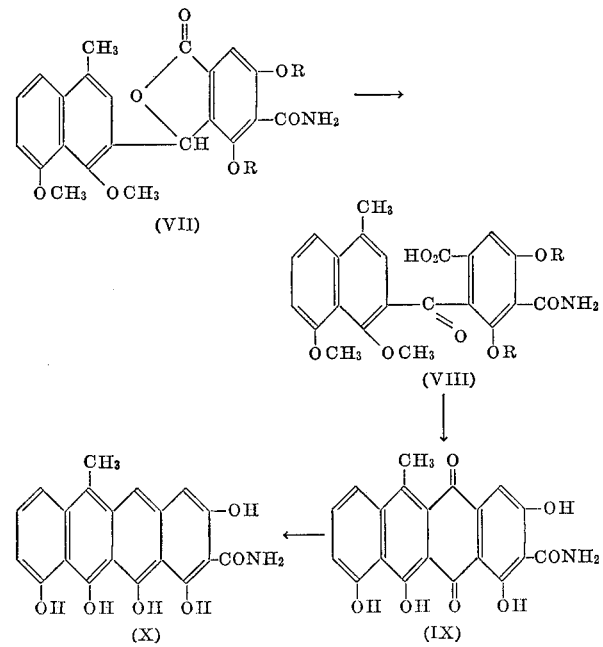

Example 1, there is obtained the 2-formyl-3,5-dihydroxyterephthalic acid, diethyl ester.

EXAMPLE 3

Preparation of 2-formyl-3,5-dihydroxyterephthalic acid, di-n-propyl ester

The procedure of Example 1 is repeated, substituting an equimolar amount of 2,6-dihydroxyterephthalic, di-n-propyl ester for the 2,6-dihydroxyterephthalic acid, dimethyl ester employed in that example. There is thus obtained the 2-formyl-3,5-dihydroryterephthalic acid, di-n-propyl ester.

EXAMPLE 4

Preparation of 2-formyl-3,5-dimethoxyterephthalic acid, dimethyl ester

In a one liter, 3-neck, round-bottom flask fitted with a mechanical stirrer, dropping funnel and condenser are placed 650 ml. of toluene and 38 g. (0.275 mole) of special milled and dried $K_2CO_3$. About 75 ml. of toluene is distilled off to remove any water from the reagents. In the dropping funnel is placed a solution of 5.25 ml. (0.055 mole) of dimethyl sulfate in 25 ml. of freshly distilled toluene, and 7 g. (0.0275 mole) of 2-formyl-3,5-dihydroxyterephthalic acid, dimethyl ester and 2 ml. of the dimethyl sulfate solution are added to the stirring mixture. Refluxing is started, the rest of the dimethyl sulfate solution is added dropwise over the next two hours, and refluxing is continued for two more hours. The slurry is cooled and filtered, the filter cake is washed with fresh toluene, and the combined filtrate and washing is evaporated to an oil, 6.2 g. The oil is taken up in 5 ml. of methanol, seeded and aged in the freezer. The yellow crystalline product is removed by filtration, washed with cold methanol and dried giving 4.038 g. (52% yield) of product, M.P. 90°–93° C. Recrystallization from hot methanol raises the melting point to 93°–95° C.

EXAMPLE 5

Preparation of 2-formyl-3,5-dimethoxyterephthalic acid, diethyl ester

In place of the 2-formyl-3,5-dihydroxyterephthalic acid, dimethyl ester of Example 4, there is employed an equimolar quantity of 2-formyl-3,5-dihydroxyterephthalic acid, diethyl ester whereby the 2-formyl-3,5-dimethoxyterephthalic acid, diethyl ester is obtained in equally good yield.

EXAMPLE 6

Preparation of 2-formyl-3,5-diethoxyterephthalic acid, dimethyl ester

By replacing the dimethyl sulfate employed in Example 4 with an equimolar quantity of diethyl sulfate and following substantially the same procedure described in Example 4, there is obtained the 2-formyl-3,5-diethoxyterephthalic acid, dimethyl ester.

EXAMPLE 7

Preparation of 2-formyl-3,5-diisopropoxyterephthalic acid, di-n-butyl ester

In the manner described in Example 4, treatment of 2-formyl-3,5-dihydroxyterephthalic acid, di-n-butyl ester with diisopropyl sulfate produces the 2-formyl-3,5-diisopropoxyterephthalic acid, di-n-butyl ester.

EXAMPLE 8

Preparation of 2 - [(1-hydroxy-8-methoxy-4-methyl-2-naphthyl)hydroxymethyl] - 3,5-dimethoxyterephthalic acid, methyl ester, γ-lactone 2.25 g. (12 m. moles) of 8 - methoxy-4-methyl-1-naphthol and 3.37 g. (12 m. moles) of 2-formyl-3,5-dimethoxyterephthalic acid, dimethyl ester were dissolved in a solution of 240 ml. of acetic acid and 24 ml. of conc. $H_2SO_4$ and let stand at room temperature in the dark for two and one-half hours. The red solution was poured into 1400 ml. of water and extracted four times with 100 ml. of toluene. The toluene was washed with 150 ml. of 5% $NaHCO_3$ and twice with 50 ml. of water. The toluene phase was concentrated to ¼ volume and used in the next step without further purification. A crude, crystalline sample of the 2-[(1 - hydroxy-8-methoxy-4-methyl-2-naphthyl) hydroxymethyl] - 3,5 - dimethoxyterephthalic acid, methyl ester, γ-lactone, was obtained by evaporation of an aliquot of the toluene solution, and the weight yield for the condensation was calculated to be 94% of theory. The product was light colored when isolated but was unstable and quickly took on a red color.

EXAMPLE 9

Preparation of 2-[(1,8-dimethoxy-4-methyl-2-naphthyl) hydroxymethyl]-3,5-dimethoxyterephthalic acid, methyl ester, γ-lactone 13.6 g. (100 m. moles) of $K_2CO_3$ and 550 ml. of toluene were placed in a 1 liter, 3-neck, round-bottom flask fitted with a mechanical stirrer. About 100 ml. of toluene was distilled off to remove water from the reagents. 4.68 ml. (50 m. moles) of $(CH_3)_2SO_4$ was diluted with 25 ml. of dry toluene in a dropping funnel. 4.3 g. (10 m. moles) of 2-[(1 - hydroxy-8-methoxy-4-methyl-2-naphthyl) hydroxymethyl] - 3,5 - dimethoxyterephthalic acid, methyl ester, γ-lactone in 100 ml. of toluene (partially crystallized) and 5 ml. of the $(CH_3)_2SO_4$ solution were added to the stirring mixture. Refluxing was started and the rest of the $(CH_3)_2SO_4$ was added dropwise over the next four hours. The methylation was followed by UV (1 N KOH/methanol) and progressed very slowly. A water separator was added to the system. Intermittantly over a two week period eight 13.6 g. portions of $K_2CO_3$ and nine 4.68 ml. portions of $(CH_3)_2SO_4$ were added. UV curves finally indicated complete loss of starting material. The reaction mixture was filtered and the toluene was washed with dilute $NH_4OH$ and water and evaporated to a yellow-green, crystalline residue. This was dissolved in 30 ml. of warm $CH_2Cl_2$ and diluted with 75 ml. of methanol. The light yellow, crystalline product, 2-[(1,8-dimethoxy-4 - methyl-2-naphthyl) hydroxymethyl]-3,5-dimethoxyterephthalic acid, methyl ester, γ-lactone, was separated giving 646 mg. (14% yield), M.P. 260°–265° C. An additional 269 mg. (6%) of 2-[(1,8-dimethoxy-4-methyl-2 - naphthyl) hydroxymethyl]-3,5-dimethoxyterephthalic acid, methyl ester, γ-lactone was obtained from the mother liquor, which was then dried to a residue, 2.87 g. This residue appeared to be a 2–3 component mixture, containing no phthalide, and no further product could be isolated from it. Repeated recrystallization of 2-[(1,8-dimethoxy-4-methyl-2-naphthyl) hydroxymethyl]-3,5-dimethoxyterephthalic acid, methyl ester, γ-lactone from $CH_2Cl_2$: methanol (2:5) gave a white product of M.P. 269°–271° C.

EXAMPLE 10

Preparation of 2 - [(1,8-dimethoxy-4-methyl-2-naphthyl) hydroxymethyl] - 3,5 - dimethoxyterephthalic acid, γ-lactone 823 mg. of 2 - [(1,8-dimethoxy-4-methyl-2-naphthyl) hydroxymethyl] - 3,5-dimethoxyterephhalic acid, methyl ester, γ-lactone was boiled with 20 ml. of 2 N NaOH+70 ml. of methanol. Some insoluble matter was separated. The solution was boiled until the methanol was removed. The alkaline mixture was acidified with 7 ml. of 6 N HCl, extracted with $CHCl_3$, and the $CHCl_3$ was dried to a tan, crystalline residue, 759 mg. (95% yield) of 2-[(1,8-dimethoxy - 4-methyl-2-naphthyl) hydroxymethyl]3,5-dimethoxyterephthalic acid, γ-lactone, M.P. 259°–260° C. d. Recrystallization from acetic acid gave white crystals, M.P. 272°–274° C. d.

EXAMPLE 11

Preparation of 4 - (chloroformyl)-2-[(1,8-dimethoxy-4-methyl - 2 - naphthyl) hydroxymethyl]-3,5-dimethoxybenzoic acid, γ-lactone 709 mg. (1.6 m. mole) of 2-[(1,8-dimethoxy-4-methyl-2 - naphthyl) hydroxymethyl]-3,5-dimethoxyterephthalic acid, γ-lactone was mixed with 10 ml. of CHCl₃ and one drop of dimethylformamide and 2 ml. (23.4 m. moles) of oxalyl chloride. The bubbling subsided and everything dissolved in about ten minutes. The solution was evaporated rapidly to dryness in vacuo. The 4-(chloroformyl) - 2 - [(1,8-dimethoxy-4-methyl-2-naphthyl) hydroxymethyl]-3,5-dimethoxybenzoic acid, γ-lactone was used directly in the next step without characterization.

EXAMPLE 12

Preparation of 2-[(1,8-dimethoxy-4-methyl-2-naphthyl) hydroxymethyl]-3,5-dimethoxyterephthalamic acid, γ-lactone The 4 - (chloroformyl)-2-[(1,8-dimethoxy-4-methyl-2-naphthyl) hydroxymethyl]-3,5-dimethoxybenzoic acid, γ-lactone, which was prepared from 709 mg. of the 2-[(1,8-dimethoxy - 4-methyl-2-naphthyl) hydroxymethyl]-3,5-dimethoxyterephthalic acid, γ-lactone, was dissolved in 4 ml. of CH₂Cl₂. 8 ml. of NH₄OH was mixed with 38 ml. of ether in an ice bath, and 30 ml. of the cold ether layer was added to the CH₂Cl₂ solution of 4-(chloroformyl)-2-[(1,8 - dimethoxy-4-methyl-2-naphthyl) hydroxymethyl]-3,5-dimethoxybenzoic acid, γ-lactone. A tan, crystalline precipitate formed at once. After 15 minutes at room temperature, the solvents were evaporated. The product was washed with 25 ml. of 2.5% NaHCO₃, filtered, washed with water, and dried giving 702 mg. (99% yield) of 2-[(1,8-dimethoxy-4-methyl-2-naphthyl) hydroxymethyl]-3,5-dimethoxyterephthalamic acid, γ-lactone, M.P. 273°–278° C. This crude product was washed with ethyl acetate to give a yellow product, M.P. 279°–286° C., which was used in the next step. Recrystallization of a portion from acetic acid gave a white product, M.P. 285°–300° C. dec.

EXAMPLE 13

Preparation of 2-(1-hydroxy-8-methoxy-4-methyl-2-naphthoyl)-3,5-dimethoxyterephthalamic acid 200 mg. (0.46 m. mole) of 2-[(1,8-dimethoxy-4-methyl-2-naphthyl) hydroxymethyl] - 3,5-dimethoxyterephthalamic acid, γ-lactone was mixed with 40 ml. of t-butanol and heated at reflux under a stream of oxygen. A hot solution of 2 g. (18 m. moles) of potassium t-butoxide in 60 ml. of t-butanol was added. Everything dissolved. The solution was refluxed for one and one-half hours, diluted with 100 ml. of tetramethylurea, and refluxed for five more hours. The reaction was quenched with 700 ml. of 0.1 N HCl, extracted with CHCl₃, and the CHCl₃ was extracted with 40 ml. of 2.5% NaHCO₃ and three times with 25 ml. of water. The aqueous extract was acidified with HCl, filtered, and dried giving 100 mg. (50% yield) of yellow, crystalline product, M.P. 263°–265° C.

EXAMPLE 14

Preparation of 5,12-dihydro-1,3,10,11-tetrahydroxy-6-methyl-5,12-dioxo-2-naphthacenecarboxamide 5 ml. of an AlBr₃-CS₃ solution was evaporated to dryness, giving 2.5 g. of AlBr₃. 50 mg. of impure 2-(1-hydroxy-8-methoxy-4-methyl-2-naphthoyl) - 3,5-dimethoxyterephthalamic acid was added to the AlBr₃ and heated at 150° C. for 30 minutes. The reaction was quenched cautiously with 30 ml. of 6 N HCl, heated on the steam bath for 15 minutes, centrifuged, and decanted. After washing with 0.1 N HCl, the solid product was dissolved in 6 ml. of water containing 0.5 ml. triethylamine and extracted with methylisobutyl ketone. The methylisobutyl ketone was washed with triethylamine-H₂O and extracted with 0.1 N NaOH. The alkaline extract was acidified with HCl in the presence of 20 ml. of CHCl₃. UV assay of the red CHCl₃ solution showed 308 γ(0.6% yield) of 5,12-dihydro - 1,3,10,11 - tetrahydroxy-6-methyl-5,12-dioxo-2-naphthacenecarboxamide. This CHCl₃ solution, in combination with others, was washed with 1% NaHCO₃ and extracted with 0.01 N NaOH. The alkaline solution was slowly acidified in the presence of acetic acid vapors, producing dark red, crystalline 5,12-dihydro-1,3,10,11-tetrahydroxy-6-methyl-5,12-dioxo - 2 - naphthacenecarboxamide. Additional 5,12-dihydro-1,3,10,11-tetrahydroxy-6-methyl-5,12-dioxo-2-naphthacenecarboxamide was prepared in 2% yield by applying the same AlBr₃ procedure to a solid material obtained by acidification of the "spent" triethylamine-H₂O solution. Another 2% yield was obtained by repeating the recycling a second time.

EXAMPLE 15

Preparation of 1,3,10,11,12-pentahydroxy-6-methyl-2-naphthacenecarboxamide 8 mg. of 5,12-dihydro-1,3,10,11-tetrahydroxy-6-methyl-5,12 - dioxo-2-naphthacenecarboxamide was mixed with 0.8 ml. of p-chlorophenol, 0.8 ml. of HI, and a drop of H₃PO₂ and heated at 115° C. for one and one-half hours. Crystallization occurred upon cooling. The whole reaction mixture was diluted with water, and the solid was separated, washed, and dried giving 4 mg. of tan, crystalline 1,3,10,11,12 - pentahydroxy - 6 - methyl-2-naphthacenecarboxamide.

We claim:

1. A compound selected from the group consisting of those of the formula:

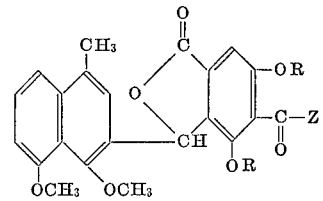

wherein R is lower alkyl and Z is selected from the group consisting of lower alkoxy, hydroxy, chloro, bromo and amino.

2. A compound according to claim 1 wherein R is methyl and Z is methoxy.

3. A compound according to claim 1 wherein R is methyl and Z is hydroxy.

4. A compound according to claim 1 wherein R is methyl and Z is chloro.

5. A compound according to claim 1 wherein R is methyl and Z is amino.

6. A compound according to claim 1 wherein R is methyl and Z is methoxy.

7. A compound according to claim 1 wherein R is methyl and Z is ethoxy.

8. A compound according to claim 1 wherein R is ethyl and Z is ethoxy.

9. A compound according to claim 1 wherein R is n-propyl and Z is bromo.

10. The process of preparing compounds of the formula:

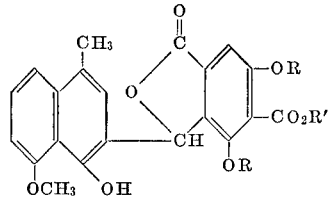

wherein R is lower alkyl and R' is lower alkyl which comprises condensing 8-methoxy-4-methyl-1-naphthol with a compound of the formula:
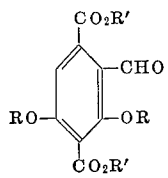
wherein R and R' are as hereinabove defined in an inert solvent and in the presence of an acidic catalyst.
References Cited
UNITED STATES PATENTS
2,716,657   8/1955   Waller et al. _____ 260—343.3
ALEX MAZEL, Primary Examiner
A. M. T. TIGHE, Assistant Examiner
U.S. Cl. X.R.
260—473, 517, 377, 559, 999